United States Patent
Lee et al.

(10) Patent No.: US 8,013,628 B2
(45) Date of Patent: Sep. 6, 2011

(54) CIRCUIT HAVING AN ACTIVE CLOCK SHIELDING STRUCTURE AND SEMICONDUCTOR INTERGRATED CIRCUIT INCLUDING THE SAME

(75) Inventors: Bong-Hyun Lee, Suwon-si (KR); Jung-Yun Choi, Hwaseong-si (KR); Jae-Han Jeon, Seoul (KR); Kyung-Tae Do, Gyeongsangnam-do (KR)

(73) Assignee: Samsung Electronics Co., Ltd. (KR)

( * ) Notice: Subject to any disclaimer, the term of this patent is extended or adjusted under 35 U.S.C. 154(b) by 22 days.

(21) Appl. No.: 12/381,431

(22) Filed: Mar. 12, 2009

(65) Prior Publication Data

US 2009/0237107 A1 Sep. 24, 2009

(30) Foreign Application Priority Data

Mar. 18, 2008 (KR) .......................... 10-2008-0025055

(51) Int. Cl.
*H03K 17/16* (2006.01)
*H03K 19/003* (2006.01)
(52) U.S. Cl. ................ 326/21; 326/28; 326/31; 326/33; 326/34; 326/98
(58) Field of Classification Search .................... 326/21, 326/26–28, 31, 33–34, 93, 95, 98
See application file for complete search history.

(56) References Cited

U.S. PATENT DOCUMENTS

| | | | | |
|---|---|---|---|---|
| 5,726,946 A * | 3/1998 | Yamagata et al. | ............ | 365/226 |
| 6,262,614 B1 * | 7/2001 | Sasaki | ............ | 327/198 |
| 6,313,683 B1 | 11/2001 | Block et al. | | |
| 6,320,418 B1 * | 11/2001 | Fujii et al. | ............ | 326/93 |
| 6,586,982 B2 * | 7/2003 | Furusawa et al. | ............ | 327/225 |
| 6,828,852 B2 * | 12/2004 | Klass et al. | ............ | 327/564 |
| 7,366,036 B2 * | 4/2008 | Cheng et al. | ............ | 365/189.09 |
| 7,420,403 B2 * | 9/2008 | Yang et al. | ............ | 327/218 |
| 2005/0168242 A1 * | 8/2005 | Won | ............ | 326/82 |
| 2007/0024318 A1 * | 2/2007 | Mamidipaka | ............ | 326/38 |
| 2007/0157144 A1 | 7/2007 | Mai et al. | | |
| 2007/0245194 A1 * | 10/2007 | Nakamura | ............ | 714/731 |
| 2009/0051388 A1 * | 2/2009 | Flynn | ............ | 326/46 |
| 2009/0189636 A1 * | 7/2009 | Amedeo et al. | ............ | 326/33 |

FOREIGN PATENT DOCUMENTS

| | | |
|---|---|---|
| JP | 2001068553 | 3/2001 |
| JP | 2007256146 | 10/2007 |
| WO | WO-2007073599 A1 | 7/2007 |

* cited by examiner

*Primary Examiner* — Jason M Crawford
(74) *Attorney, Agent, or Firm* — Mills & Onello, LLP (57) ABSTRACT

A circuit having an active clock shielding structure includes a logic circuit that receives a clock signal and performs a logic operation based on the clock signal, a power gating circuit that switches a mode of the logic circuit between an active mode and an sleep mode based on a power gating signal, a clock signal transmission line that transmits the clock signal to the logic circuit, and at least one power gating signal transmission line that transmits the power gating signal to the power gating circuit and functions as a shielding line pair with the clock signal transmission line.

21 Claims, 6 Drawing Sheets

CIRCUIT HAVING AN ACTIVE CLOCK SHIELDING STRUCTURE AND SEMICONDUCTOR INTERGRATED CIRCUIT INCLUDING THE SAME

BACKGROUND

1. Field

Example embodiments relate to a semiconductor circuit, and, more particularly, to a circuit having an active clock shielding structure and a semiconductor integrated circuit including the same.

2. Description of the Related Art

As semiconductor process technology continues to develop, the degree of integration for a semiconductor integrated circuit continues to increase. As a result, signal interference (e.g., coupling noise) between signal lines becomes more problematic because the number of signal lines per unit area continues to increase.

For this reason, it is common for designers to include additional shielding lines for preventing signal interference. However, the inclusion of such additional shielding lines can degrade the degree of integration of the semiconductor integrated circuit and can increase design overhead.

SUMMARY

Accordingly, embodiments of the present invention are provided to substantially obviate one or more problems due to limitations and disadvantages of the related art.

In some example embodiments, a circuit having an active clock shielding structure, comprises: a logic circuit configured to receive a clock signal and to perform a logic operation based on the clock signal; a power gating circuit configured to switch a mode of the logic circuit between an active mode and a sleep mode based on a power gating signal; a clock signal transmission line configured to transmit the clock signal to the logic circuit; and at least one power gating signal transmission line configured to transmit the power gating signal to the power gating circuit, the at least one power gating signal transmission line functioning as a shielding line pair with the clock signal transmission line.

In some embodiments, the at least one power gating signal transmission line is configured to run in parallel with the clock signal transmission line.

In some embodiments, the at least one power gating signal transmission line encompasses the clock signal transmission line.

In some embodiments the clock signal is transmitted during operation in the active mode and is not transmitted during operation in the sleep mode, and the operation mode of the logic circuit is changed from the active mode to the sleep mode based on an activation timing of the power gating signal, and the mode of the logic circuit is changed from the sleep mode to the active mode based on a deactivation timing of the power gating signal.

In some embodiments, the circuit further comprises: a retention flip-flop configured to receive a retention signal to preserve data during operation in the sleep mode based on the retention signal; and at least one retention signal transmission line configured to transmit the retention signal to the retention flip-flop, the at least one retention signal transmission line functioning as a shielding line pair with the clock signal transmission line.

In some embodiments, the at least one power gating signal transmission line is configured to run in parallel with the clock signal transmission line.

In some embodiments, the at least one power gating signal transmission line encompasses the clock signal transmission line.

In some embodiments, the at least one retention signal transmission line is configured to run in parallel with the clock signal transmission line.

In some embodiments, the at least one retention signal transmission line encompasses the clock signal transmission line.

In some embodiments, both the at least one power gating signal transmission line and the at least one retention signal transmission line encompass the clock signal transmission line while running parallel with the clock signal transmission line.

In some embodiments, the clock signal is transmitted during operation in the active mode and is not transmitted during operation in the sleep mode, and the sleep mode includes a sleep-in mode, a sleep-state mode, and a sleep-out mode.

In some embodiments, the operation mode of the logic circuit is changed from the sleep-in mode to the sleep-state mode based on an activation timing of the power gating signal after the retention signal is activated during the sleep-in mode.

In some embodiments, the retention signal is deactivated during the sleep-out mode after the mode of the logic circuit is changed from the sleep-state mode to the sleep-out mode based on a deactivation timing of the power gating signal.

In some example embodiments, a semiconductor integrated circuit, comprises: a clock signal gating unit configured to control a transmission of a clock signal; a power gating control unit configured to control an activation of a power gating signal or a retention signal to determine a power gating operation; and at least one circuit having an active clock shielding structure configured to receive the clock signal and to operate based on the power gating operation. The at least one circuit having the active clock shielding structure comprises: a logic circuit configured to receive the clock signal and to perform a logic operation based on the clock signal; a power gating circuit configured to switch a mode of the logic circuit between an active mode and a sleep mode based on the power gating signal; a clock signal transmission line configured to transmit the clock signal to the logic circuit; and at least one power gating signal transmission line configured to transmit the power gating signal to the power gating circuit, the at least one power gating signal transmission line functioning as a shielding line pair with the clock signal transmission line.

In some embodiments, the at least one power gating signal transmission line is configured to run in parallel with the clock signal transmission line.

In some embodiments, the at least one power gating signal transmission line encompasses the clock signal transmission line.

In some embodiments, the at least one circuit having the active clock shielding structure further comprises: a retention flip-flop configured to receive a retention signal to preserve data during operation in the sleep mode based on the retention signal; and at least one retention signal transmission line configured to transmit the retention signal to the retention flip-flop, the at least one retention signal transmission line functioning as a shielding line pair with the clock signal transmission line.

In some embodiments, the at least one power gating signal transmission line is configured to run in parallel with the clock signal transmission line.

In some embodiments, the at least one power gating signal transmission line encompasses the clock signal transmission line.

In some embodiments, the at least one retention signal transmission line is configured to run in parallel with the clock signal transmission line.

In some embodiments, the at least one retention signal transmission line encompasses the clock signal transmission line.

In some embodiments, both the at least one power gating signal transmission line and the at least one retention signal transmission line encompass the clock signal transmission line while running parallel with the clock signal transmission line.

Some example embodiments provide a circuit having an active clock shielding structure capable of preventing signal interference (e.g., coupling noise) among signal lines by using power gating signal transmission lines or/and retention signal transmission lines as a shielding line pair with a clock signal transmission line without the need for additional shielding lines.

Some example embodiments provide a semiconductor integrated circuit capable of achieving a high degree of integration, low power consumption, and high reliability by including a circuit having an active clock shielding structure that uses power gating signal transmission lines or/and retention signal transmission lines as a shielding line pair with a clock signal transmission line without additional shielding lines.

DETAILED DESCRIPTION OF EMBODIMENTS

This application claims priority under 35 USC §119 to Korean Patent Application No. 10-2008-0025055, filed on Mar. 18, 2008 in the Korean Intellectual Property Office (KIPO); the contents of which are herein incorporated by reference in their entirety.

Various example embodiments will be described more fully with reference to the accompanying drawings, in which embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
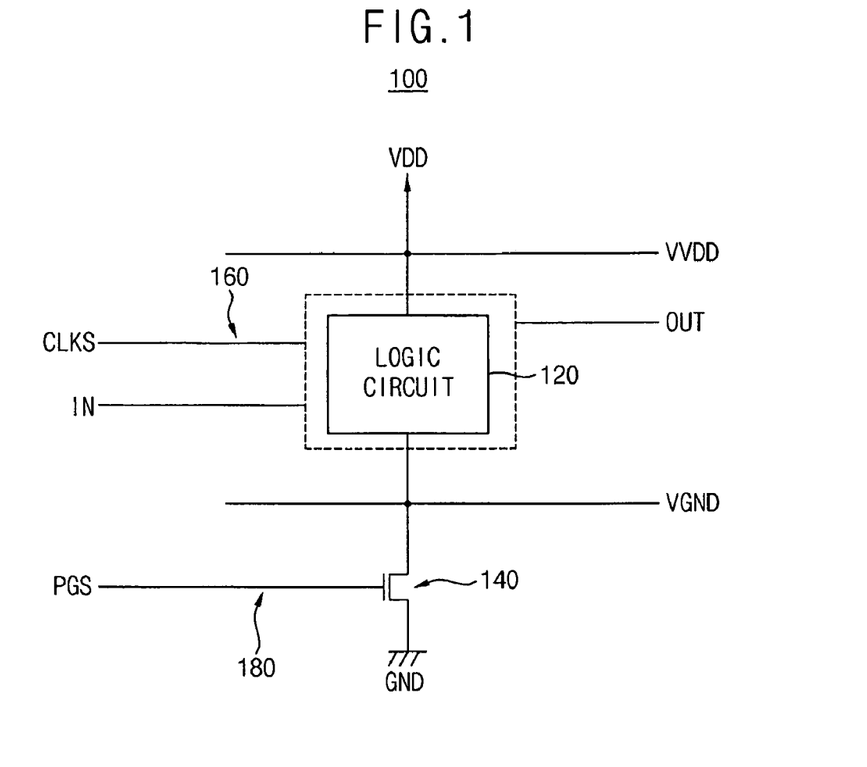
FIG. 1 is a diagram illustrating a circuit having an active clock shielding structure according to an example embodiment.

FIG. 1 is a diagram illustrating a circuit having an active clock shielding structure according to an example embodiment.

Referring to FIG. 1, the circuit 100 having the active clock shielding structure may include a logic circuit 120, a power gating circuit 140, a clock signal transmission line 160, and a power gating signal transmission line 180.

The logic circuit 120 is coupled between a virtual power voltage line VVDD and a virtual ground voltage line VGND.

The logic circuit 120 may include a plurality of logic devices such as latches and flip-flops, in turn having a plurality of transistors. The logic circuit 120 receives a clock signal CLKS and an input signal IN, and performs a logic operation. In a case where the circuit 100 employs a multi-threshold complementary metal-oxide semiconductor (MTCMOS) technology, the logic circuit 120 performs the logic operation during an active mode. On the other hand, the logic circuit 120 can be disabled into a standby-state or a power-down state during a sleep mode and the clock signal CLKS transmitted to the logic circuit 120 is deactivated during the sleep mode.

The power gating circuit 140 switches a mode of the logic circuit 120 between the active mode and the sleep mode based on a power gating signal PGS. The power gating circuit 140 may include a CMOS transistor having a relatively high threshold voltage that performs a switching operation based on the power gating signal PGS. The power gating circuit 140 can be coupled between a ground voltage GND and the virtual ground voltage line VGND as illustrated in FIG. 1. Alternatively, the power gating circuit 140 can be coupled between a power voltage VDD and the virtual power voltage line VVDD. During operation in the active mode, the CMOS transistor in the power gating circuit 140 turns on and the logic circuit 120 can perform the logic operation at high speed since the logic circuit 120 includes CMOS transistors having a relatively low threshold voltage. During operation in the sleep mode, the CMOS transistor in the power gating circuit 140 turns off and the logic circuit 120 enters a standby-state. Leakage current can be reduced during the sleep mode since the power gating circuit 140 includes the CMOS transistor having the relatively high threshold voltage.

As illustrated in FIG. 1, the power gating circuit 140 may be coupled between the ground voltage GND and the virtual ground voltage line VGND. In some embodiments, the power gating circuit 140 may be coupled between the power voltage VDD and the virtual power voltage line VVDD. Further, in some embodiments, a first power gating circuit may be coupled between the ground voltage GND and the virtual ground voltage line VGND and a second power gating circuit may be coupled between the power voltage VDD and the virtual power voltage line VVDD.

The clock signal transmission line 160 transmits the clock signal CLKS to the logic circuit 120. During the active mode, the clock signal CLKS is transmitted to the logic circuit 120 on the clock signal transmission line 160. During operation in the sleep mode, the clock signal CLKS on the clock signal transmission line 160 is deactivated. The power gating signal transmission line 180 transmits the power gating signal PGS to the power gating circuit 140. The power gating signal transmission line 180 can be used as a shielding line for the clock signal transmission line 160 and the clock signal transmission line 160 may be used as a shielding line for the power gating signal transmission line 180 because the transmission on the clock signal transmission line 160 and the transmission on the power gating signal transmission line 180 are complementary to each other, depending on operation modes. The power gating signal transmission line 180 is configured to run parallel with the clock signal transmission line 160. When the circuit 100 includes a plurality of power gating signal transmission lines, the plurality of power gating signal transmission lines can surround, or encircle, the clock signal transmission line 160 while running parallel with the clock signal transmission line 160.

Figure 2:
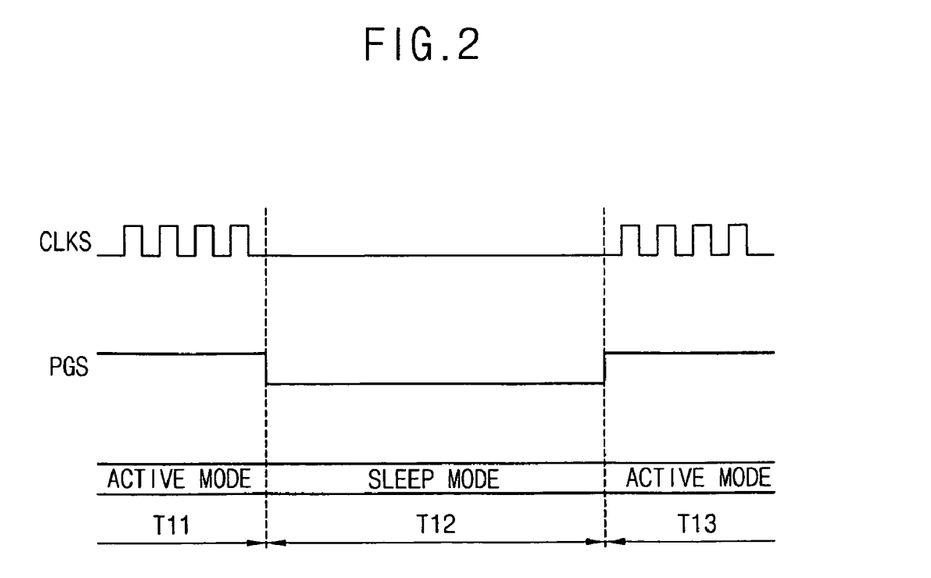
FIG. 2 is a timing diagram illustrating the behavior of a clock signal on a clock signal transmission line and a power gating signal on a power gating signal transmission line in the circuit of FIG. 1.

FIG. 2 is a timing diagram illustrating the behavior of a clock signal on a clock signal transmission line and a power gating signal on a power gating signal transmission line in the circuit of FIG. 1.

Referring to FIG. 2, the clock signal CLKS may be transmitted to the logic circuit 120 during operation in the active mode T11 and T13. On the other hand, in one embodiment, the clock signal CLKS is not transmitted to the logic circuit 120 during the sleep mode T12. For example, the operation mode of the logic circuit 120 is changed from the active mode T11 to the sleep mode T12 based on an activation timing (e.g., a timing when a logic level is changed from HIGH to LOW) of the power gating signal PGS on the power gating signal transmission line 180. The operation mode of the logic circuit is changed from the sleep mode T12 to the active mode T13 based on a deactivation timing (e.g., a timing when a logic level is changed from LOW to HIGH) of the power gating signal PGS on the power gating signal transmission line 180.

Figure 3A:
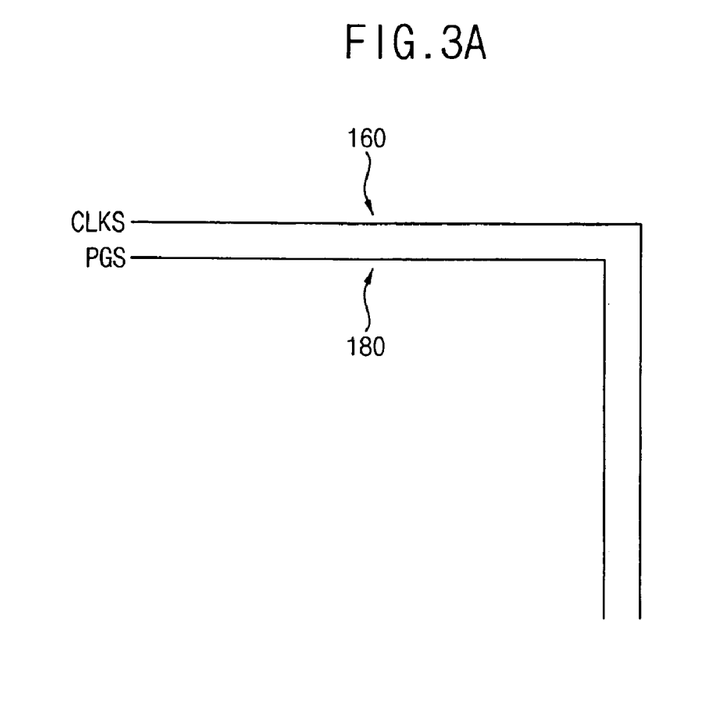
FIG. 3A is a diagram illustrating a first example arrangement of a clock signal transmission line and a power gating signal transmission line in the circuit of FIG. 1.

FIG. 3A is a diagram illustrating a first example arrangement of a clock signal transmission line 160 and a power gating signal transmission line 180 in the circuit of FIG. 1.

Referring to FIG. 3A, the power gating signal transmission line 180 can be configured to run parallel with the clock signal transmission line 160. That is, the power gating signal transmission line 180 can be used as a shielding line for the clock signal transmission line 160 and the clock signal transmission line 160 can be used as a shielding line for the power gating signal transmission line 180. In certain embodiments, the power gating signal transmission line 180 and the clock signal transmission line 160, and other shielding lines, can be neighboring lines that are close in proximity to each other either in a horizontal direction on a substrate or in a vertical direction on the substrate.

Figure 3B:
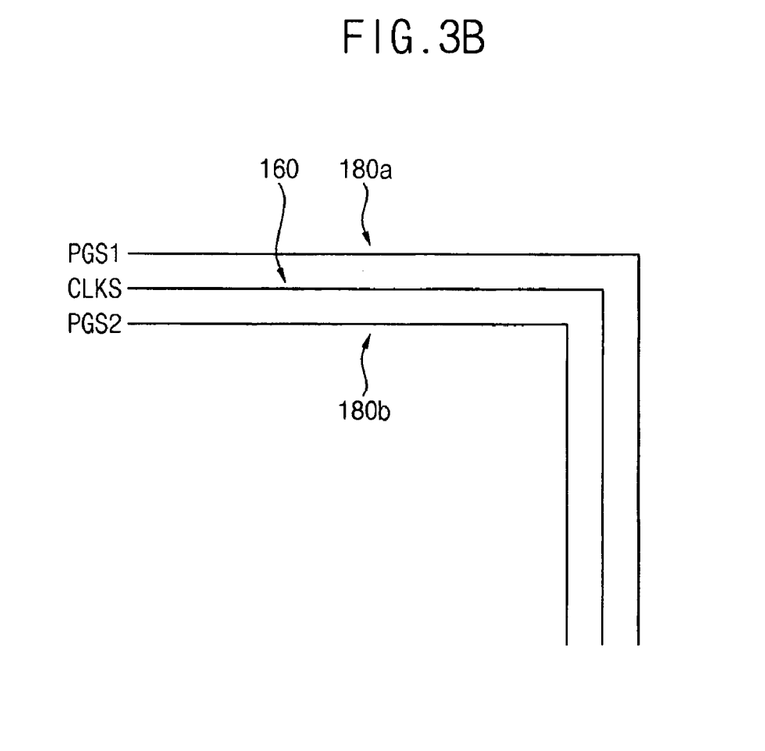
FIG. 3B is a diagram illustrating a second example arrangement of a clock signal transmission line and a power gating signal transmission line in the circuit of FIG. 1.

FIG. 3B is a diagram illustrating a second example arrangement of a clock signal transmission line and a power gating signal transmission line in the circuit of FIG. 1.

Referring to FIG. 3B, the circuit 100 can be configured to include two power gating signal transmission lines 180a and 180b. The power gating signal transmission lines 180a and 180b can be configured to surround, enclose, or encompass the clock signal transmission line 160 symmetrically while running parallel with the clock signal transmission line 160. That is, the power gating signal transmission lines 180a and 180b can be used as a shielding line for the clock signal transmission line 160 and the clock signal transmission line 160 can be used as a shielding line for the power gating signal transmission lines 180a and 180b. When the circuit 100 includes a plurality of power gating signal transmission lines, the plurality of power gating signal transmission lines can be configured to surround, enclose or encompass the clock signal transmission line 160 while running parallel with the clock signal transmission line 160.

Figure 4:
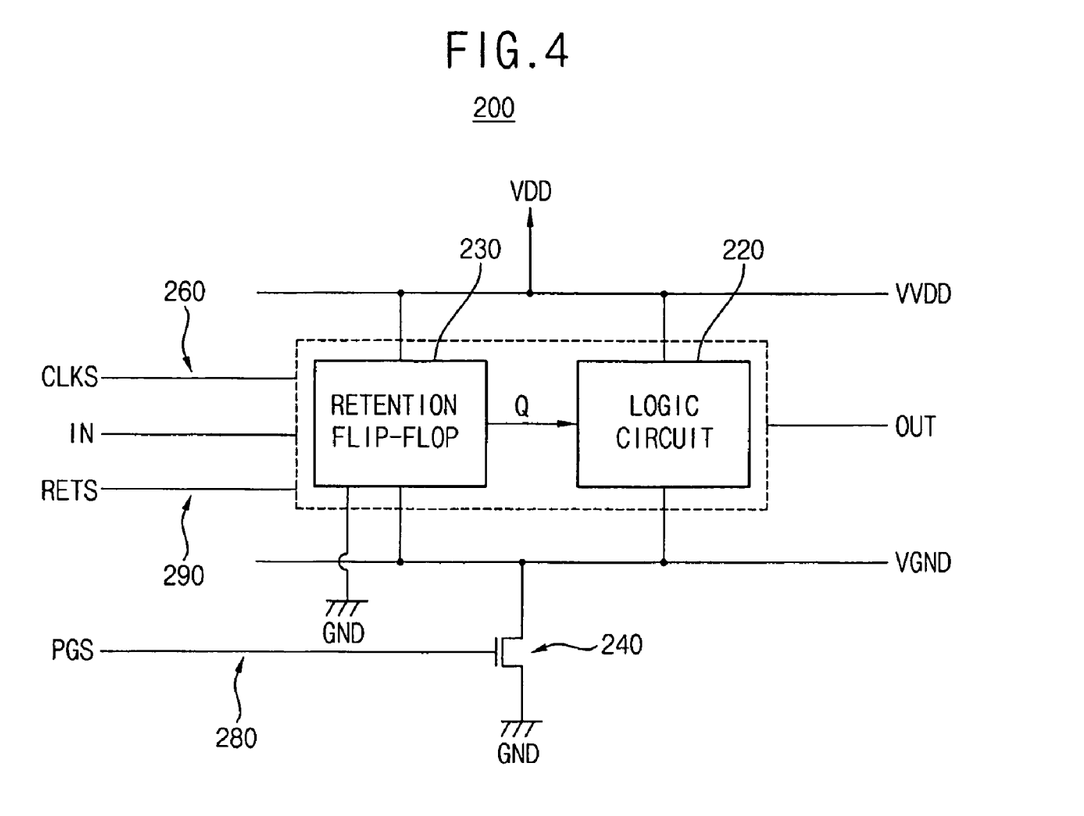
FIG. 4 is a diagram illustrating a circuit having an active clock shielding structure according to another example embodiment.

FIG. 4 is a diagram illustrating a circuit having an active clock shielding structure according to another example embodiment.

Referring to FIG. 4, the circuit 200 having the active clock shielding structure can be configured to include a logic circuit 220, a retention flip-flop 230, a power gating circuit 240, a clock signal transmission line 260, a power gating signal transmission line 280, and a retention signal transmission line 290.

The retention flip-flop 230 samples an input signal IN based on a clock signal CLKS and a retention signal RETS to generate and store data Q. The circuit 200 may preserve the data Q during a sleep mode by including the retention flip-flop 230. As illustrated in FIG. 4, the retention flip-flop 230 is configured to receive one retention signal RETS. However, the retention flip-flop 230 can optionally be configured to receive a plurality of retention signal RETS.

The logic circuit 220 is coupled between a virtual power voltage line VVDD and a virtual ground voltage line VGND.

The logic circuit 220 may include a plurality of logic devices such as latches and flip-flops having a plurality of transistors. The logic circuit 220 receives the clock signal CLKS and the input signal IN to perform a logic operation. In the circuit 200 employing a MTCMOS technology, the logic circuit 220 performs the logic operation during an active mode. On the other hand, the logic circuit 220 can be disabled into a standby-state or a power-down state during a sleep mode, during which time the clock signal CLKS transmitted to the logic circuit 220 is deactivated. After the mode of the logic circuit 220 is changed from the sleep mode to the active mode, the logic circuit 220 performs the logic operation by receiving the data Q that is preserved by the retention flip-flop 230. That is, the circuit 200 may retain the validity and reliability of the data Q by including the retention flip-flop 230.

The power gating circuit 240 switches the mode of the logic circuit 220 between the active mode and the sleep mode based on a power gating signal PGS. The power gating circuit 240 can include a CMOS transistor having a relatively high threshold voltage that performs a switching operation based on the power gating signal PGS. The power gating circuit 240 can be coupled between a ground voltage GND and the virtual ground voltage line VGND as illustrated in FIG. 4. Alternatively, the power gating circuit 240 can be coupled between a power voltage VDD and the virtual power voltage line VVDD. During operation in the active mode, the CMOS transistor in the power gating circuit 240 turns on and the logic circuit 220 can perform the logic operation at high speed since the logic circuit 220 includes CMOS transistors having a relatively low threshold voltage. During operation in the sleep mode, the CMOS transistor in the power gating circuit 240 turns off and the logic circuit 220 can enter a standby-state. Leakage current can be reduced during operation in the sleep mode since the power gating circuit 240 includes the CMOS transistor having the relatively high threshold voltage.

As illustrated in FIG. 4, the power gating circuit 240 can be coupled between the ground voltage GND and the virtual ground voltage line VGND. In some embodiments, the power gating circuit 240 is coupled between the power voltage VDD and the virtual power voltage line VVDD. Further, in some embodiments, a first power gating circuit is coupled between the ground voltage GND and the virtual ground voltage line VGND and a second power gating circuit is coupled between the power voltage VDD and the virtual power voltage line VVDD.

The clock signal transmission line 260 transmits the clock signal CLKS to the logic circuit 220. During operation in the active mode, the clock signal CLKS is transmitted to the logic circuit 220 on the clock signal transmission line 260. During operation in the sleep mode, the clock signal CLKS on the clock signal transmission line 260 is deactivated. The power gating signal transmission line 280 transmits the power gating signal PGS to the power gating circuit 240. The power gating signal transmission line 280 can be used as a shielding line for the clock signal transmission line 260 and the clock signal transmission line 260 can be used as a shielding line for the power gating signal transmission line 280 because the transmission on the clock signal transmission line 260 and the transmission on the power gating signal transmission line 280 are complementary to each other, depending on operation modes. The power gating signal transmission line 280 is configured to run in parallel with the clock signal transmission line 260. When the circuit 200 includes a plurality of power gating signal transmission lines, the plurality of power gating signal transmission lines can be configured to surround, encompass, or encircle the clock signal transmission line 260 while running parallel with the clock signal transmission line 160.

The retention signal transmission line 290 transmits the retention signal RETS to the retention flip-flop 230. The retention signal transmission line 290 can also be used as a shielding line for the clock signal transmission line 260 and the clock signal transmission line 260 can also be used as a shielding line for the retention signal transmission line 290 because the transmission on the clock signal transmission line 260 and the transmission on the retention signal transmission line 290 are complementary to each other, depending on the operation mode. The retention signal transmission line 290 can be configured to run parallel with the clock signal transmission line 260. When the circuit 200 includes a plurality of retention signal transmission lines, the plurality of retention signal transmission lines can be configured to encompass, surround, or encircle the clock signal transmission line 260 while running parallel with the clock signal transmission line 260.

Figure 5:
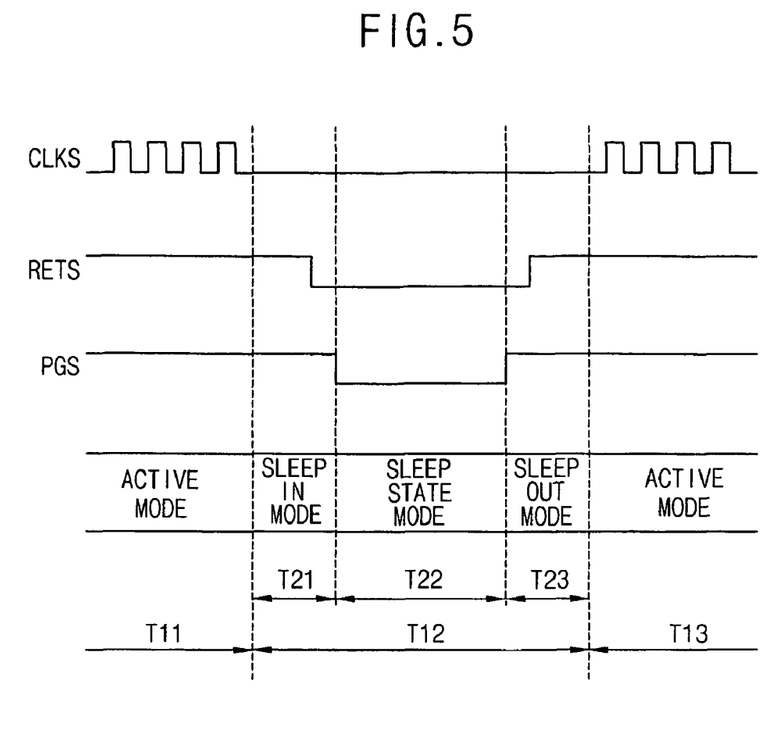
FIG. 5 is a timing diagram illustrating the behavior of a clock signal on a clock signal transmission line, a power gating signal on a power gating signal transmission line, and a retention signal on a retention signal transmission line in the circuit of FIG. 4.

FIG. 5 is a timing diagram illustrating the behavior of a clock signal on a clock signal transmission line, a power gating signal on a power gating signal transmission line, and a retention signal on a retention signal transmission line in the circuit of FIG. 4.

Referring to FIG. 5, the sleep mode T12 may in turn include a sleep-in mode T21, a sleep-state mode T22, and a sleep-out mode T23. The sleep-in mode is a mode of operation that is between the active mode T11 and the sleep-state mode T22. The sleep-state mode T22 is a mode of operation where the logic circuit 220 does not perform the logic operation. The sleep-out mode T23 is a mode of operation between the sleep-state mode T22 and the active mode T13. The clock signal CLKS is transmitted to the logic circuit 220 during operation in the active mode T11 and T13. The clock signal CLKS is not transmitted to the logic circuit 220 during operation in the sleep mode T12. That is, the clock signal CLKS is not transmitted to the logic circuit 220 after the mode of the logic circuit 220 is changed from the active mode T11 to the sleep-in mode T21. The clock signal CLKS is again transmitted to the logic circuit 220 after the mode of the logic circuit 220 is changed from the sleep-out mode to the active mode T13.

The power gating signal PGS is activated (e.g., a logic level is changed from HIGH to LOW) after the retention signal RETS is activated (e.g., a logic level is changed from HIGH to LOW) during operation in the sleep-in mode T21. The operation mode of the logic circuit 220 is changed from the sleep-in mode T21 to the sleep-state mode T22 based on the activation timing (e.g., the timing when a logic level is changed from HIGH to LOW) of the power gating signal PGS on the power gating signal transmission line 280. The activation timing of the retention signal RETS is during a first time period that is earlier than the activation timing of the power gating signal PGS because the retention flip-flop 230 requires the first time period to prevent new input signals IN from being received and to store the previous data Q.

When the power gating signal PGS is deactivated (e.g., a logic level is changed from LOW to HIGH) during operation in the sleep-state mode T22, the mode of the logic circuit 220 is changed from the sleep-state mode T22 to the sleep-out mode T23 based on the deactivation timing (e.g., the timing when a logic level is changed from LOW to HIGH) of the power gating signal PGS on the power gating signal transmission line 280. Then, the retention signal RETS is deactivated (e.g., a logic level is changed from LOW to HIGH) during operation in the sleep-out mode T23. After the operation mode of the logic circuit 220 is changed from the sleep-out mode T23 to the active mode T13, the clock signal CLKS is again transmitted to the logic circuit 220. The deactivation timing of the retention signal RETS is during a second time period that follows the deactivation timing of the power gating signal PGS, because the retention flip-flop 230 requires the second time period to discharge the virtual power voltage line VVDD and/or the virtual ground voltage line VGND for removing noise in the circuit nodes.

Figure 6A:
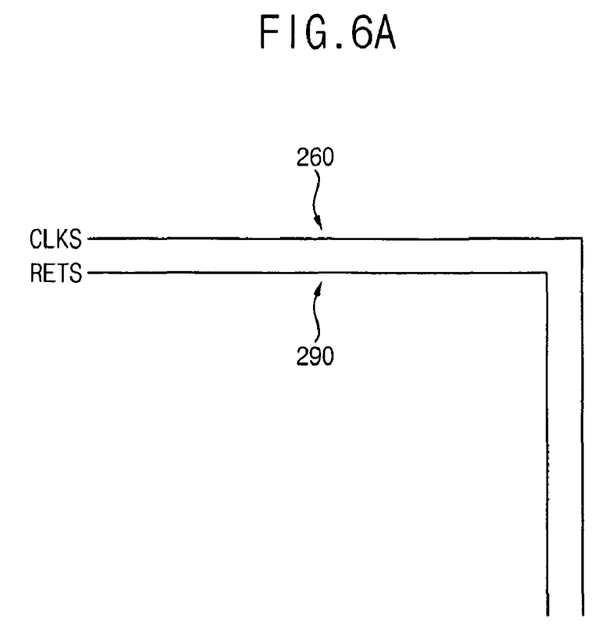
FIG. 6A is a diagram illustrating a first example arrangement of a clock signal transmission line, a power gating signal transmission line, and a retention signal transmission line in the circuit of FIG. 4.

FIG. 6A is a diagram illustrating a first example arrangement of a clock signal transmission line, a power gating signal transmission line, and a retention signal transmission line in the circuit of FIG. 4.

Referring to FIG. 4, the retention signal transmission line 290 can be configured to run in parallel with the clock signal transmission line 260. That is, the retention signal transmission line 290 can be used as a shielding line for the clock signal transmission line 260 and the clock signal transmission line 260 can be used as a shielding line for the retention signal transmission line 290. Although it is not shown, a power gating signal transmission line can also be configured to run parallel with the clock signal transmission line 260 to function as a shielding line pair with the clock signal transmission line 260.

Figure 6B:
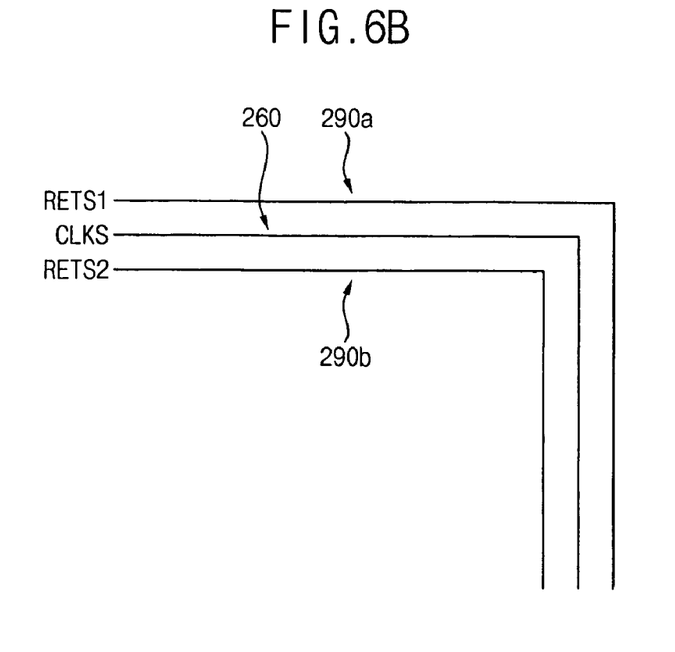
FIG. 6B is a diagram illustrating a second example arrangement of a clock signal transmission line, a power gating signal transmission line, and a retention signal transmission line in the circuit of FIG. 4.

FIG. 6B is a diagram illustrating a second example arrangement of a clock signal transmission line, a power gating signal transmission line, and a retention signal transmission line in the circuit of FIG. 4.

Referring to FIG. 6B, the circuit 200 may include two retention signal transmission lines 290a and 290b. The retention signal transmission lines 290a and 290b may surround, encompass, or enclose the clock signal transmission line 260 symmetrically while running parallel with the clock signal transmission line 260. That is, the retention signal transmission lines 290a and 290b can be used as a shielding line for the clock signal transmission line 260 and the clock signal transmission line 260 can be used as a shielding line for the retention signal transmission lines 290a and 290b. When the circuit 200 includes a plurality of retention signal transmission lines, the plurality of retention signal transmission lines can be configured to enclose the clock signal transmission line 260 while running in parallel with the clock signal transmission line 260. Although it is not shown, at least one power gating signal transmission line can be configured to run in parallel with the clock signal transmission line 260 to function as a shielding line pair with the clock signal transmission line 260.

Figure 6C:
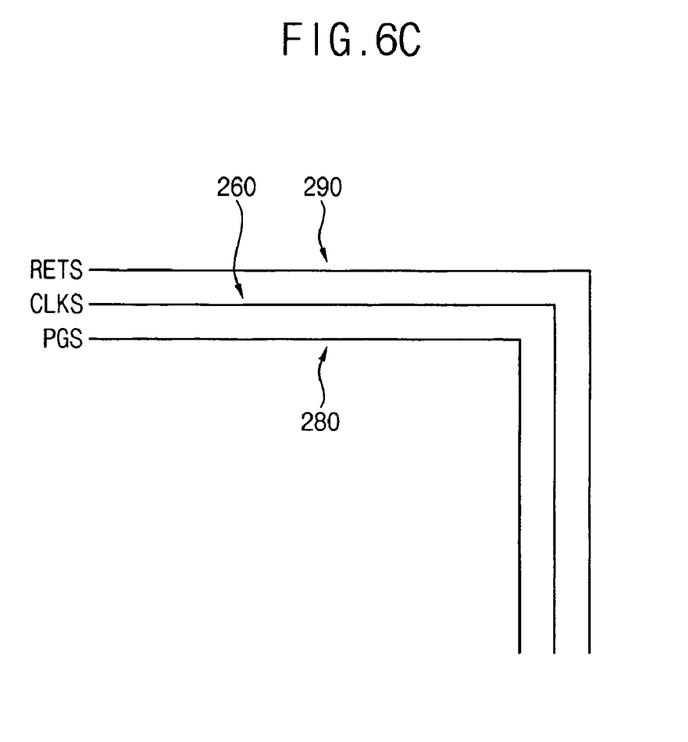
FIG. 6C is a diagram illustrating a third example arrangement of a clock signal transmission line, a power gating signal transmission line, and a retention signal transmission line in the circuit of FIG. 4.

FIG. 6C is a diagram illustrating a third example arrangement of a clock signal transmission line, a power gating signal transmission line, and a retention signal transmission line in the circuit of FIG. 4.

Referring to FIG. 6C, the power gating signal transmission line 280 and the retention signal transmission line 290 can be configured to surround, encompass or enclose the clock signal transmission line 260 symmetrically while running parallel with the clock signal transmission line 260. That is, the power gating signal transmission line 280 and the retention signal transmission line 290 can be used as a shielding line for the clock signal transmission line 260 and the clock signal transmission line 260 can be used as a shielding line for the power gating signal transmission line 280 and the retention signal transmission line 290. When the circuit 200 includes a plurality of power gating signal transmission lines and a plurality of retention signal transmission lines, the plurality of power gating signal transmission lines and the plurality of retention signal transmission lines can be configured to sur-round, encompass or enclose the clock signal transmission line 260 while running in parallel with the clock signal transmission line 260.

Figure 7:
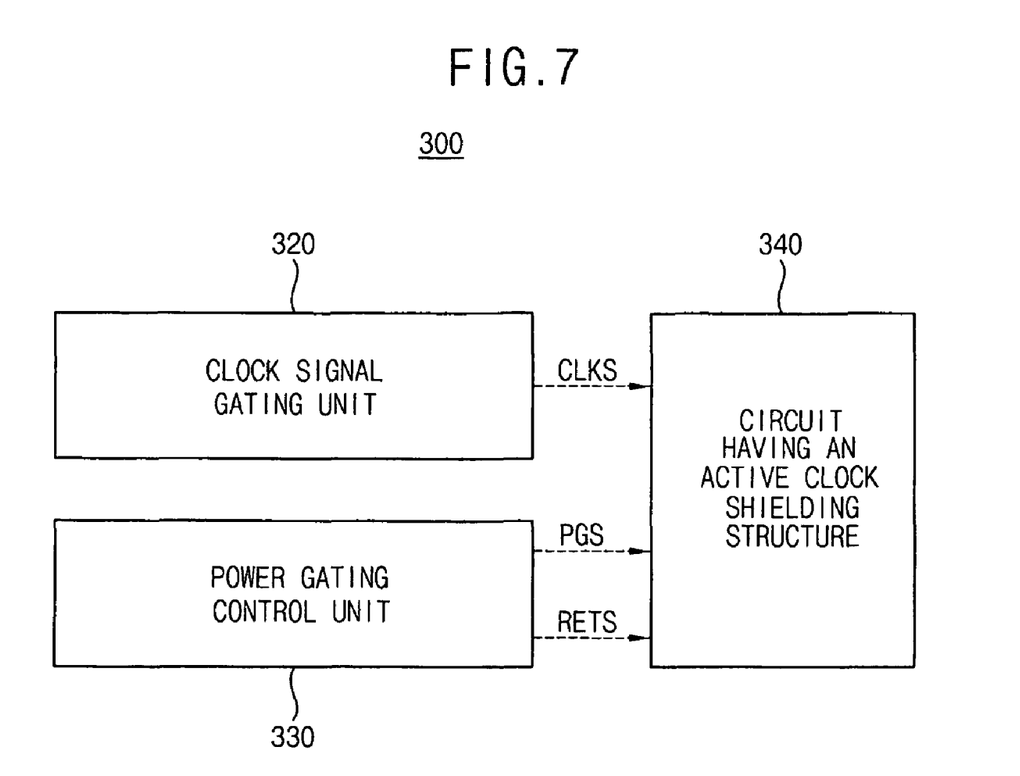
FIG. 7 is a block diagram illustrating a semiconductor integrated circuit according to an example embodiment.

FIG. 7 is a diagram illustrating a semiconductor integrated circuit according to an example embodiment.

Referring to FIG. 7, the semiconductor integrated circuit 300 may include a clock signal gating unit 320, a power gating control unit 330, and a circuit 340 having an active clock shielding structure.

The clock signal gating unit 320 controls the transmission of a clock signal CLKS. The clock signal gating unit 320 provides the clock signal CLKS to the circuit 340 during operation in an active mode. On the other hand, the clock signal gating unit 320 does not provide the clock signal CLKS to the circuit 340 during operation in a sleep mode. In this manner, power consumption can be reduced during operation in the sleep mode. The power gating control unit 330 controls the activation of a power gating signal PGS or a retention signal RETS to determine a power gating operation (i.e., operation in the active mode and operation in the sleep mode). Based on the power gating operation, the circuit 340 receives the clock signal CLKS, performs a logic operation, and is placed into a standby state or a power-down state during the sleep mode.

The circuit 340 can include a logic circuit that receives the clock signal CLKS and performs the logic operation based on the clock signal CLKS, a power gating circuit that switches the mode of the logic circuit between the active mode and the sleep mode based on the power gating signal PGS, a clock signal transmission line that transmits the clock signal CLKS to the logic circuit, and at least one power gating signal transmission line that transmits the power gating signal PGS to the power gating circuit and functions as a shielding line pair with the clock signal transmission line. In addition, the circuit 340 can further include a retention flip-flop that receives the retention signal RETS and preserves data during the sleep mode based on the retention signal RETS, and at least one retention signal transmission line that transmits the retention signal RETS to the retention flip-flop and functions as a shielding line pair with the clock signal transmission line.

As illustrated in FIG. 7, the semiconductor integrated circuit 300 includes a single circuit 340 having the active clock shielding structure. However, the semiconductor integrated circuit 300 can be configured to include a plurality of circuits having the active clock shielding structure. As a result, the resulting semiconductor integrated circuit 300 does not require additional shielding lines for properly shielding the clock signal transmission line. Instead, the semiconductor integrated circuit 300 in accordance with the present embodiment uses the plurality of power gating signal transmission lines and/or the plurality of retention signal transmission lines as a shielding line pair with the clock signal transmission line.

As described above, a power gating signal transmission line can be configured to run in parallel with a clock signal transmission line, two power gating signal transmission line can be configured to surround, encompass or enclose a clock signal transmission line symmetrically while running parallel with the clock signal transmission line, a retention signal transmission line can be configured to run in parallel with a clock signal transmission line, two retention signal transmission lines can be configured to surround, encompass or enclose a clock signal transmission line symmetrically while running in parallel with the clock signal transmission line, and a power gating signal transmission line and a retention signal transmission line can be configured to surround, encompass or enclose a clock signal transmission line symmetrically while running in parallel with the clock signal transmission line. As used herein, the terms "surround", "encompass" or "enclose" are used interchangeably to mean that at least two lines are configured generally parallel to another line at opposed surfaces of the other line in sufficient proximity, and the at least two lines and/or the other line carry an appropriate signal, so as to provide a shielding function either by the at least two lines or by the other line. In certain embodiments, the at least two shielding lines neighbor the other line. Complete surrounding, encompassing, or enclosure by the at least two lines of the other line is not required.

Further, when a circuit having an active clock shielding structure includes a plurality of power gating signal transmission lines and/or a plurality of retention signal transmission lines, the plurality of power gating signal transmission lines and/or the plurality of retention signal transmission lines can be configured to surround, encompass or encircle a clock signal transmission line while running parallel with the clock signal transmission line. However, the active clock shielding structures are just example embodiments so that various changes, substitutions and alterations may be made without departing from the scope of the invention.

A circuit having an active clock shielding structure according to some example embodiments can prevent signal interference among signal lines by using power gating signal transmission lines and/or retention signal transmission lines as a shielding line for a clock signal transmission line without needing to include additional shielding lines. Further, a semiconductor integrated circuit according to some example embodiments can achieve a high degree of integration, low power consumption, and high reliability by including the circuit having the active clock shielding structure. Therefore, the circuit having the active clock shielding structure and the semiconductor integrated circuit having the circuit may be applicable to semiconductor devices, electronic devices, and electronic mobile devices that employ MTCMOS technologies.

While the example embodiments and their advantages have been described in detail, it should be understood that various changes, substitutions and alterations may be made herein without departing from the scope of the invention.

What is claimed is:

1. A circuit having an active clock shielding structure, comprising:
   a logic circuit configured to receive a clock signal and to perform a logic operation based on the clock signal;
   a power gating circuit configured to switch a mode of the logic circuit between an active mode and a sleep mode based on a power gating signal;
   a clock signal transmission line configured to transmit the clock signal to the logic circuit;
   at least one power gating signal transmission line configured to transmit the power gating signal to the power gating circuit, the at least one power gating signal transmission line functioning as a shielding line pair with the clock signal transmission line;
   a retention flip-flop configured to receive a retention signal to preserve data during operation in the sleep mode based on the retention signal; and
   at least one retention signal transmission line configured to transmit the retention signal to the retention flip-flop, the at least one retention signal transmission line functioning as a shielding line pair with the clock signal transmission line,
   wherein both the at least one power gating signal transmission line and the at least one retention signal transmission line encompass the clock signal transmission line while running parallel with the clock signal transmission line.

2. The circuit of claim 1, wherein the clock signal is transmitted during operation in the active mode and is not transmitted during operation in the sleep mode, and
   wherein the operation mode of the logic circuit is changed from the active mode to the sleep mode based on an activation timing of the power gating signal, and the mode of the logic circuit is changed from the sleep mode to the active mode based on a deactivation timing of the power gating signal.

3. The circuit of claim 1, wherein the clock signal is transmitted during operation in the active mode and is not transmitted during operation in the sleep mode, and
   wherein the sleep mode includes a sleep-in mode, a sleep-state mode, and a sleep-out mode.

4. The circuit of claim 3, wherein the operation mode of the logic circuit is changed from the sleep-in mode to the sleep-state mode based on an activation timing of the power gating signal after the retention signal is activated during the sleep-in mode.

5. The circuit of claim 4, wherein the retention signal is deactivated during the sleep-out mode after the mode of the logic circuit is changed from the sleep-state mode to the sleep-out mode based on a deactivation timing of the power gating signal.

6. A semiconductor integrated circuit, comprising:
   a clock signal gating unit configured to control a transmission of a clock signal;
   a power gating control unit configured to control an activation of a power gating signal or a retention signal to determine a power gating operation; and
   at least one circuit having an active clock shielding structure configured to receive the clock signal and to operate based on the power gating operation, the at least one circuit having the active clock shielding structure comprising:
      a logic circuit configured to receive the clock signal and to perform a logic operation based on the clock signal;
      a power gating circuit configured to switch a mode of the logic circuit between an active mode and a sleep mode based on the power gating signal;
      a clock signal transmission line configured to transmit the clock signal to the logic circuit;
      at least one power gating signal transmission line configured to transmit the power gating signal to the power gating circuit, the at least one power gating signal transmission line functioning as a shielding line pair with the clock signal transmission line;
      a retention flip-flop configured to receive a retention signal to preserve data during operation in the sleep mode based on the retention signal; and
      at least one retention signal transmission line configured to transmit the retention signal to the retention flip-flop, the at least one retention signal transmission line functioning as a shielding line pair with the clock signal transmission line,
      wherein both the at least one power gating signal transmission line and the at least one retention signal transmission line encompass the clock signal transmission line while running parallel with the clock signal transmission line.

7. The circuit of claim 6, wherein the clock signal is transmitted during operation in the active mode and is not transmitted during operation in the sleep mode, and wherein the operation mode of the logic circuit is changed from the active mode to the sleep mode based on an activation timing of the power gating signal, and the mode of the logic circuit is changed from the sleep mode to the active mode based on a deactivation timing of the power gating signal.

8. The circuit of claim 6, wherein the clock signal is transmitted during operation in the active mode and is not transmitted during operation in the sleep mode, and wherein the sleep mode includes a sleep-in mode, a sleep-state mode, and a sleep-out mode.

9. The circuit of claim 8, wherein the operation mode of the logic circuit is changed from the sleep-in mode to the sleep-state mode based on an activation timing of the power gating signal after the retention signal is activated during the sleep-in mode.

10. The circuit of claim 9, wherein the retention signal is deactivated during the sleep-out mode after the mode of the logic circuit is changed from the sleep-state mode to the sleep-out mode based on a deactivation timing of the power gating signal.

11. A circuit having an active clock shielding structure, comprising:
a logic circuit configured to receive a clock signal and to perform a logic operation based on the clock signal;
a power gating circuit configured to switch a mode of the logic circuit between an active mode and a sleep mode based on a power gating signal;
a clock signal transmission line configured to transmit the clock signal to the logic circuit;
at least one power gating signal transmission line configured to transmit the power gating signal to the power gating circuit, the at least one power gating signal transmission line functioning as a shielding line pair with the clock signal transmission line;
a retention flip-flop configured to receive a retention signal to preserve data during operation in the sleep mode based on the retention signal; and
at least one retention signal transmission line configured to transmit the retention signal to the retention flip-flop, the at least one retention signal transmission line functioning as a shielding line pair with the clock signal transmission line,
wherein the clock signal is transmitted during operation in the active mode and is not transmitted during operation in the sleep mode, and wherein the sleep mode includes a sleep-in mode, a sleep-state mode, and a sleep-out mode.

12. The circuit of claim 11, wherein the at least one power gating signal transmission line is configured to run in parallel with the clock signal transmission line.

13. The circuit of claim 12, wherein the at least one power gating signal transmission line encompasses the clock signal transmission line.

14. The circuit of claim 11, wherein the clock signal is transmitted during operation in the active mode and is not transmitted during operation in the sleep mode, and wherein the operation mode of the logic circuit is changed from the active mode to the sleep mode based on an activation timing of the power gating signal, and the mode of the logic circuit is changed from the sleep mode to the active mode based on a deactivation timing of the power gating signal.

15. The circuit of claim 11, wherein the at least one power gating signal transmission line is configured to run in parallel with the clock signal transmission line.

16. The circuit of claim 15, wherein the at least one power gating signal transmission line encompasses the clock signal transmission line.

17. The circuit of claim 11, wherein the at least one retention signal transmission line is configured to run in parallel with the clock signal transmission line.

18. The circuit of claim 17, wherein the at least one retention signal transmission line encompasses the clock signal transmission line.

19. The circuit of claim 11, wherein both the at least one power gating signal transmission line and the at least one retention signal transmission line encompass the clock signal transmission line while running parallel with the clock signal transmission line.

20. The circuit of claim 11, wherein the operation mode of the logic circuit is changed from the sleep-in mode to the sleep-state mode based on an activation timing of the power gating signal after the retention signal is activated during the sleep-in mode.

21. The circuit of claim 20, wherein the retention signal is deactivated during the sleep-out mode after the mode of the logic circuit is changed from the sleep-state mode to the sleep-out mode based on a deactivation timing of the power gating signal.

* * * * *